(12) United States Patent
Tu et al.

(10) Patent No.: US 7,533,444 B2
(45) Date of Patent: May 19, 2009

(54) HINGE MECHANISM FOR FOLDABLE ELECTRONIC DEVICE

(75) Inventors: Ying-Liang Tu, Shenzhen (CN); Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 343 days.

(21) Appl. No.: 11/347,467

(22) Filed: Feb. 3, 2006

(65) Prior Publication Data
US 2006/0218748 A1 Oct. 5, 2006

(30) Foreign Application Priority Data
Apr. 1, 2005 (CN) .................. 2005 1 0033931

(51) Int. Cl.
*E05F 1/14* (2006.01)
(52) U.S. Cl. .............................. 16/283; 16/303; 16/280; 16/284
(58) Field of Classification Search .............. 16/303, 16/304, 305, 306, 307, 280, 283, 284; 455/575.3; 379/433.11, 433.2, 433.13; 361/680, 681, 361/682, 683
See application file for complete search history.

(56) References Cited

U.S. PATENT DOCUMENTS

| 6,950,686 | B2* | 9/2005 | Won ........................ 455/575.3 |
| 7,085,375 | B2* | 8/2006 | Katoh ..................... 379/433.13 |
| 7,171,247 | B2* | 1/2007 | Han ........................ 455/575.3 |
| 7,237,304 | B2* | 7/2007 | Duan et al. ................... 16/324 |

FOREIGN PATENT DOCUMENTS

CN 03236411.3 5/2004

* cited by examiner

*Primary Examiner*—Victor Batson
*Assistant Examiner*—Jeffrey O'Brien
(74) *Attorney, Agent, or Firm*—Steven M. Reiss (57) ABSTRACT

A hinge mechanism (20) includes a mounting member (12), at least one retractable elastic shaft (14) and a rotating member (18). The retractable elastic shaft has two opposite ends. The mounting member is located at one end of the retractable elastic shaft and defines at least one first hollow (125). The rotating member is located at the other end of the retractable elastic shaft and defines at least one second hollow (187). The first and second hollows respectively receive two ends of the retractable elastic shaft. The mounting member is rotatable relative to the rotating member to drive the retractable elastic shaft to move between a first position where the retractable elastic shaft is slantwise to an axis of the rotating member and a second position where the retractable elastic shaft is parallel to the axis of the rotating member. The hinge mechanism is easy to be manufactured.

19 Claims, 8 Drawing Sheets

HINGE MECHANISM FOR FOLDABLE ELECTRONIC DEVICE

BACKGROUND OF THE INVENTION

1. Field of the Invention

The present invention generally relates to hinge mechanisms and, more particularly, to a hinge mechanism for hinging together housings of a foldable, portable electronic device such as a mobile phone or a PDA (Personal Digital Assistant).

2. Discussion of the Related Art

Portable mobile phones generally have two housings rotatably joined by a type of hinge that allows the housings to fold upon one another. Many such foldable mobile phones have most of the electronics in one housing, called the main housing, and fewer electronics in the other housing, called the cover. Other such foldable mobile phones have all the electronics in the main housing, with the cover serving only to cover a keypad and a display of the main housing. The main housing and the cover are connected together by a hinge mechanism. Generally, the opening or closing of most covers is achieved by means of a cam mechanism and a spring of the hinge mechanism.

A typical hinge mechanism for foldable mobile phones comprises a shaft, an elastic member, a cam and a cam follower. The cam and the cam follower each have a cam surface attached to the other. The cam, the cam follower and the elastic member surround the shaft. The elastic member directly abuts against the cam. The cam follower matches (i.e., mates and operatively connects) with a main housing of the portable mobile phone. In a similar fashion, the cam matches with a cover. When the cover is being opened, the cam rotates together with the cover, and it rotates relative to the elastic member and the cam follower.

The above-described hinge mechanism has a cam and a cam follower each having a cam surface. However, cam surfaces of the cam and cam follower are difficult to be manufactured. Further, an open angle between the cover and the main housing is determined by the figure of the cam surfaces. Accordingly, the cam surfaces in above-described hinge mechanism are even difficult to be manufactured to satisfy a request open angle.

What is needed, therefore, is a hinge mechanism which is easy to be manufactured.

SUMMARY OF THE INVENTION

A hinge mechanism includes at least one retractable elastic shaft, a mounting member, and a rotating member. The retractable elastic shaft has two opposite ends. The mounting member is located at one end of the retractable elastic shaft and defines at least one first hollow therein. The rotating member is located at the other end of the retractable elastic shaft, and defines at least one second hollow therein. The first and second hollows respectively receive the two ends of the retractable elastic shaft. The mounting member is rotatable relative to the rotating member to drive the retractable elastic shaft to move between a first position where the retractable elastic shaft is slantwise to an axis of the rotating member and a second position where the retractable elastic shaft is parallel to the axis of the rotating member.

Other advantages and novel features of preferred embodiments of the present hinge mechanism and its applications will become more apparent from the following detailed description when taken in conjunction with the accompanying drawings.

BRIEF DESCRIPTION OF THE DRAWINGS

Many aspects of the present hinge mechanisms and their applications can be better understood with reference to the following drawings. The components in the drawings are not necessarily to scale, the emphasis instead being placed upon clearly illustrating the principles of the hinge mechanisms. Moreover, in the drawings, like reference numerals designate corresponding parts throughout the several views.

DETAILED DESCRIPTION OF PREFERRED EMBODIMENTS

Figure 1:
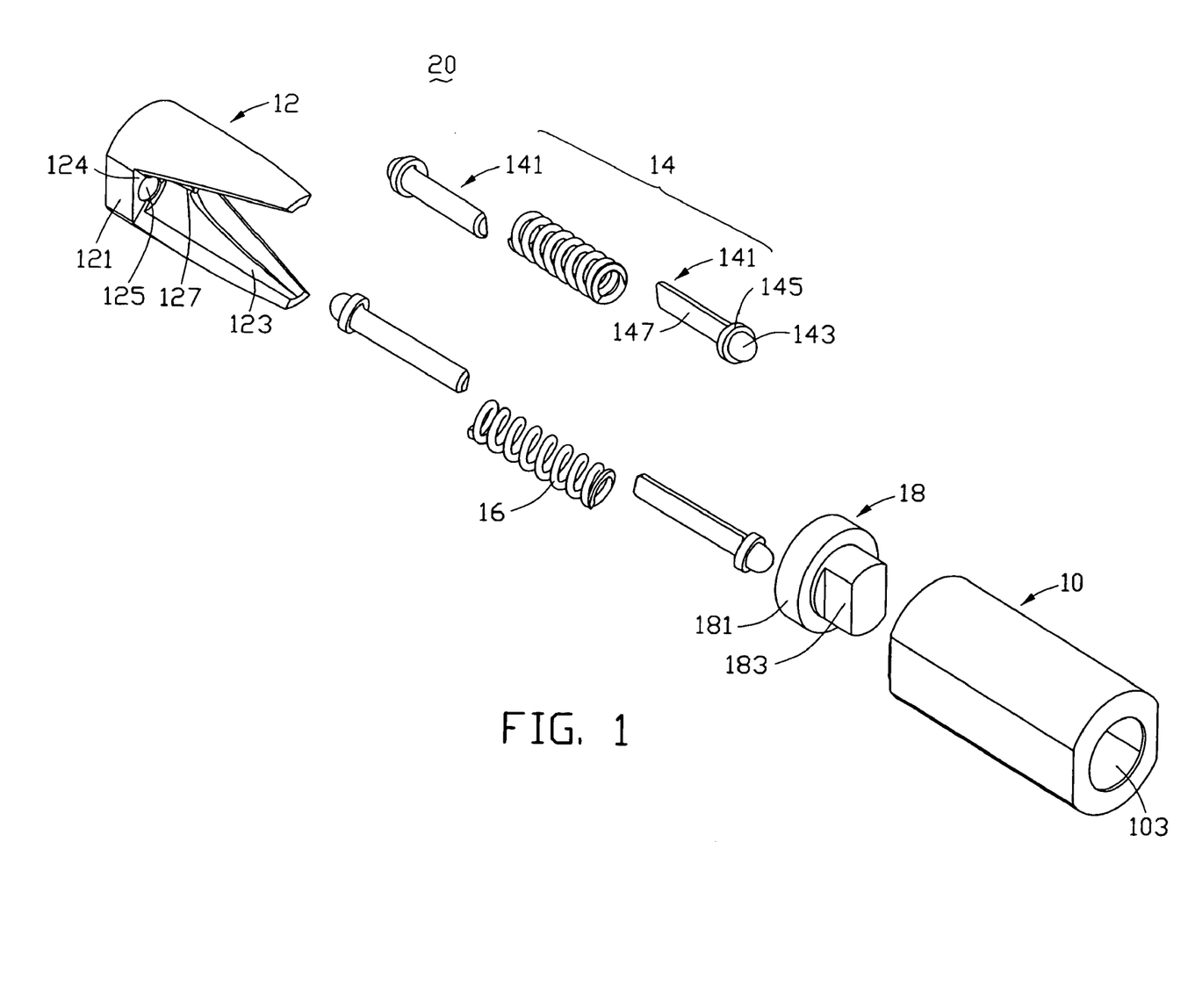
FIG. 1 is an exploded, isometric view of a hinge mechanism in accordance with a preferred embodiment of the present invention.
Figure 2:
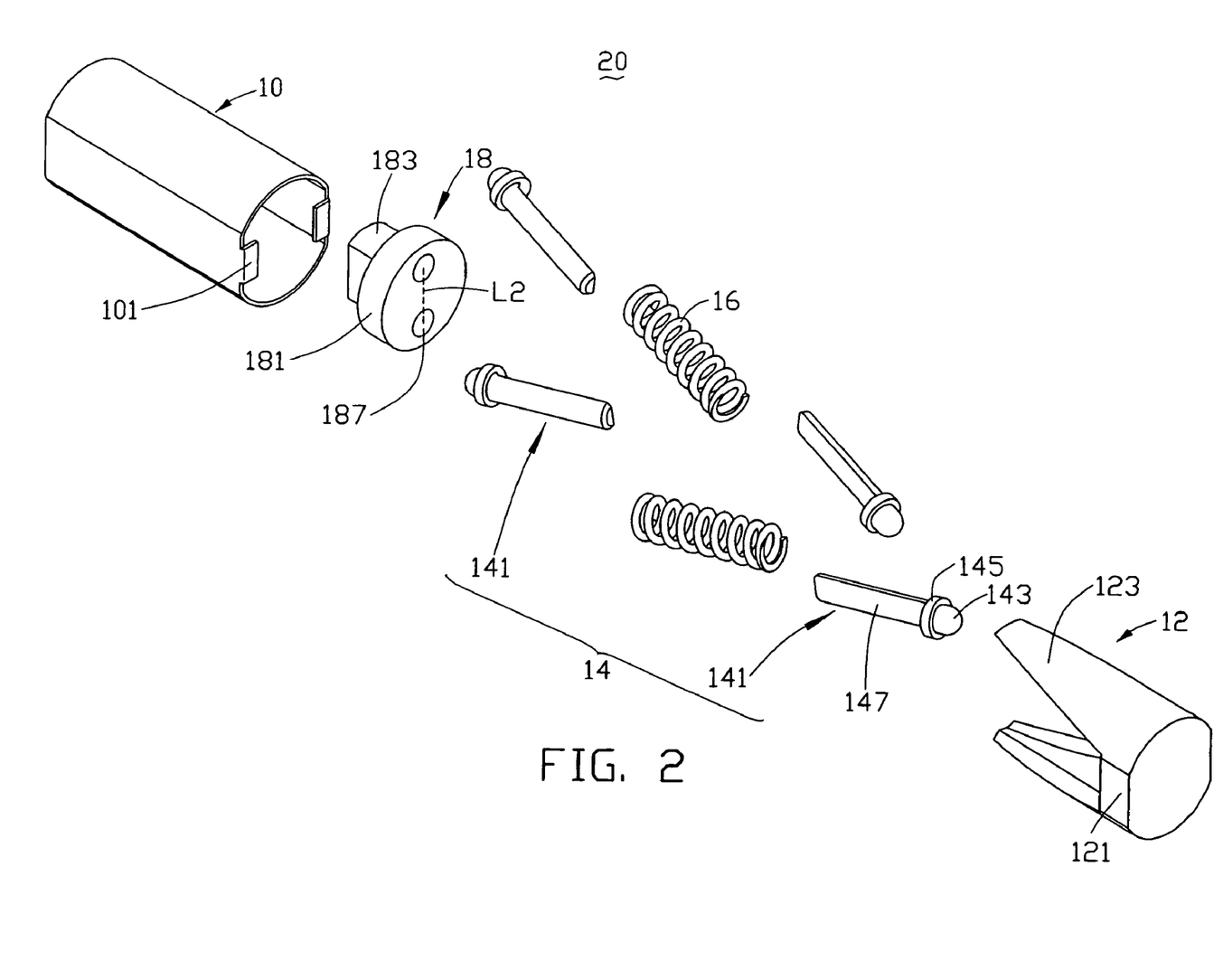
FIG. 2 is similar to FIG. 1, but viewed from another aspect.

Referring to FIG. 1 and FIG. 2, a hinge mechanism 20 includes a case 10, a mounting member 12, two combined shafts 14, two springs 16, and a rotating member 18.

The case 10 is a hollow deformed cylinder having a wall with a non-round inner surface and a non-round outside surface. One end of the case 10 is open and an opposite end defines a hole 103. Two pieces 101 are symmetrically formed at the open end of the case 10. The pieces 101 are bendable, and are parallel to an axis of the case 10 before assembling the hinge mechanism 20, and perpendicular to the axis of the case 10 for partly covering the open end after assembling.

Figure 3:
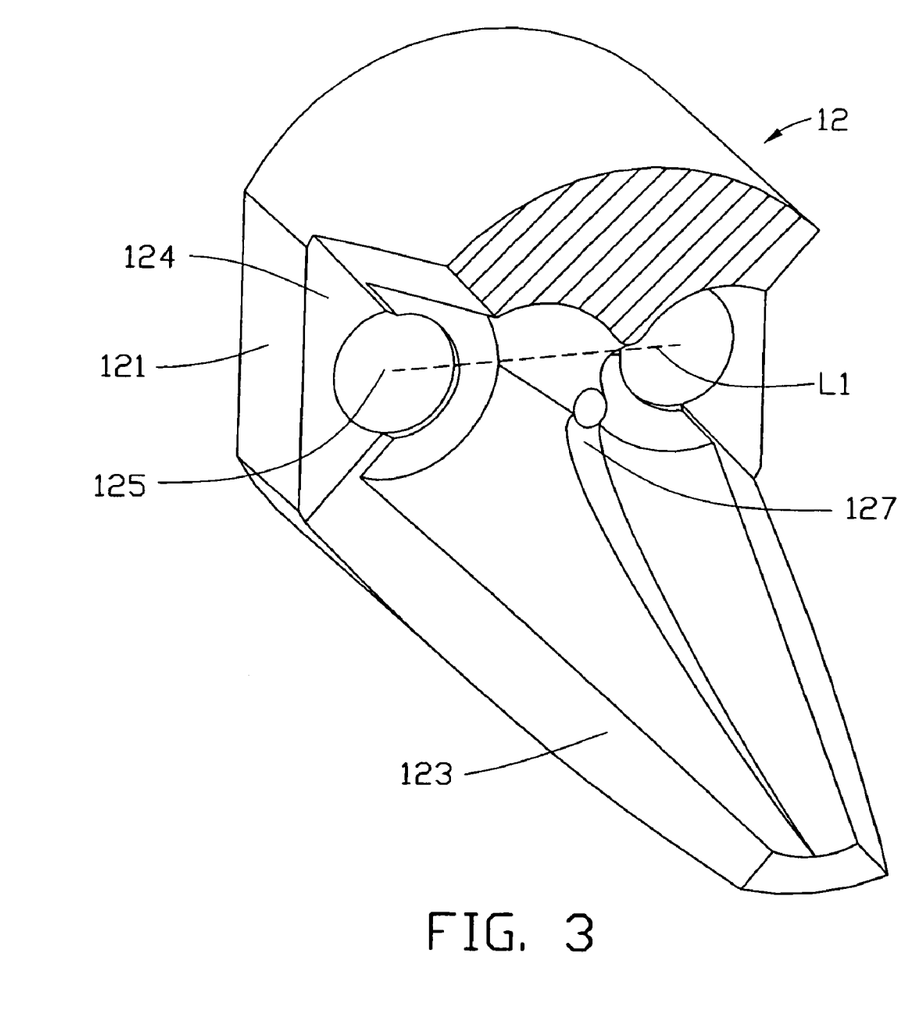
FIG. 3 is an enlarged, cut-away view of part of the hinge mechanism of FIG. 1.

Referring also to FIG. 3, the mounting member 12 includes a base 121 and two extensions 123. The base 121 is a deformed cylinder having a non-round surface corresponding to the inner surface of the case 10. The base 121 has a base surface 124 and two hemispherical first hollows 125 are symmetrically defined in the base 121 on the base surface 124 about a diameter of the base 121. A hypothetical line L1 that connects centers of the first hollows 125 passes the center of the base 121. The extensions 123 separately extend in a same direction from a circumferential edge of the base surface 124, symmetrical about the line L1 connecting centers of the first hollows 125. The outer surfaces of the extensions 123 are commonly located on a hypothetical cylinder. Sizes of the extensions 123 along a circumference of the hypothetical cylinder gradually decrease along the extending direction thereof A mid-wall 127 shorter than the extensions 123 is formed between the first hollows 125 and connects the extensions 123. The extensions 123 and the mid-wall 127 cooperatively define two receiving spaces (not labeled) for receiving the combined shafts 14. The mounting member 12 is fixedly (i.e., unrotatably) set in the case 10.

Each combined shaft 14 includes two discrete shaft members 141. Each shaft member 141 includes a head portion 143, a flange 145, and a shank portion 147. The flange 145 is arranged between the head portion 143 and the shank portion 147. The head portion 143 has a hemispherical outer end. The shank portion 147 is half-cylinder-shaped and has a flat surface. The shank portions 147 of the two shaft members 141 lean against each other with the flat surface thereof facing each other to form a cylinder-shaped shank portion (not labeled), with the head portions 143 being located at opposite two ends of the combined shaft 14. The head portions 143 at one end of the combined shafts 14 rotatably respectively engage in the first hollows 125 of the mounting member 12.

Each of the springs 16 is cylinder-shaped (i.e., occupying a cylindrical volume), and has two ends. The spring 16 surrounds the shank portions 147 of a respective one of the combined shafts 14. The ends of the spring 16 respectively resiliently abut against the flanges 145 of the respective combined shaft 14.

The rotating member 18 includes a limiting portion 181 and a deformed shaft portion 183. The limiting portion 181 is cylinder-shaped and defines two hemispherical second hollows 187. The second hollows 187 are symmetrically defined about a diameter of the limiting portion 181. A hypothetical line L2 connecting centers of the second hollows 187 passes the center of the limiting portion 181. The limiting portion 181 of the rotating member 18 is set in the case 10, with the deformed shaft portion 183 protruding out of the case 10 from the hole 103. The rotating member 18 is rotatable relative to the case 10. The head portions 143 at opposite end of the combined shafts 14 respectively engage in the second hollows 187 of the rotating member 18.

Figure 4:
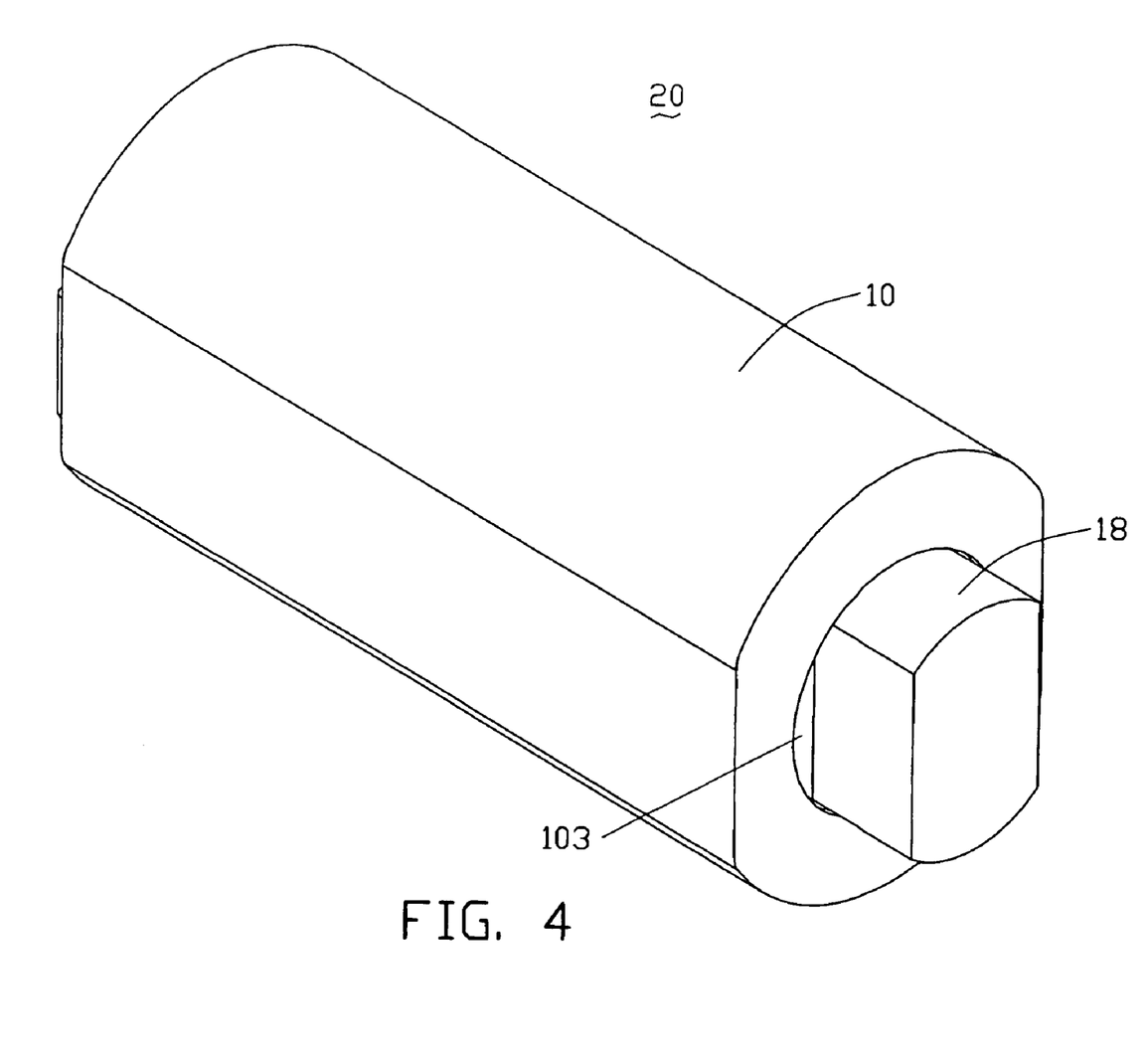
FIG. 4 is an assembled view of FIG. 1.
Figure 5:
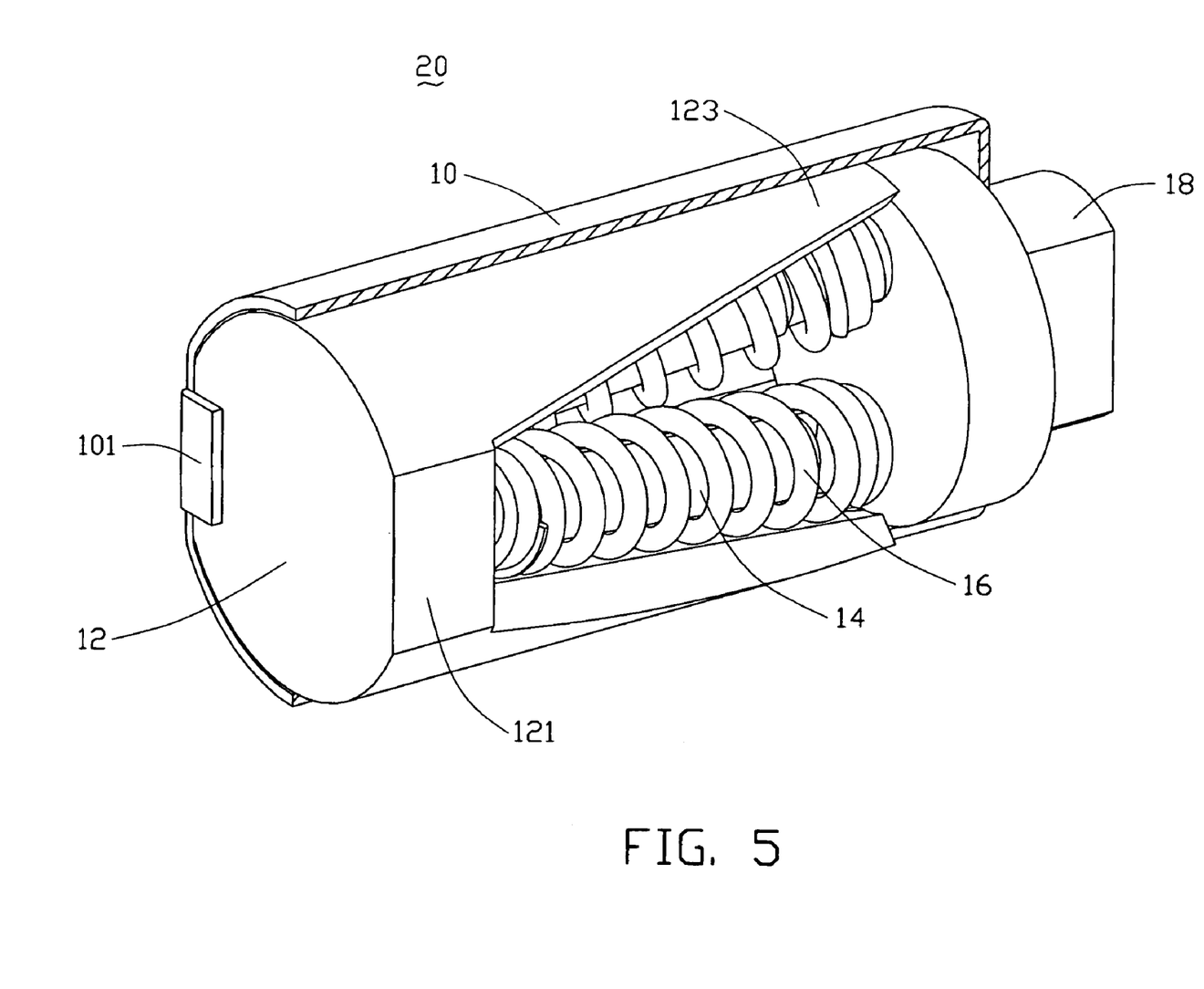
FIG. 5 is a cut-away view of the hinge mechanism of FIG. 4, viewed from a different aspect, and showing an original close state.

Referring to FIG. 4 and FIG. 5, in assembly, one spring 16 is set around the shank portion 147 of one shaft member 141, and another shaft member 141 is inserted into the spring 16 to make the spring 16 surround the another shaft member 141 in the same manner. Thus, one combined shaft 14 is assembled. Another combined shaft 14 is assembled in a same way as described above. The rotating member 18 is assembled in the case 10, with the deformed shaft portion 183 protruding out of the case 10. The combined shafts 14 and the springs 16 are assembled in the case 10, with the head portions 143 at one end of the combined shafts 14 engaging in the second hollows 187. Then, the mounting member 12 is assembled in the case 10 to make the combined shafts 14 are respectively disposed at two sides of the mid-wall 127. The head portions 143 at the other end of the combined shafts 14 engage with the first hollows 125 of the mounting member 12, and the line L1 connecting centers of the first hollows 125 is perpendicular to the line L2 connecting centers of the second hollows 187. In this state, the springs 16 are compressed between the first and second hollows 125, 187. Finally, the pieces 101 of the case 10 are bended toward the end of the base 121 of the mounting member 12. The pieces 101 prevent the mounting member 12, the combined shafts 14, the springs 16 and the rotating member 18 from being disassembled from the case 10. Therefore, the springs 16 are maintained in the compressed state.

Figure 8:
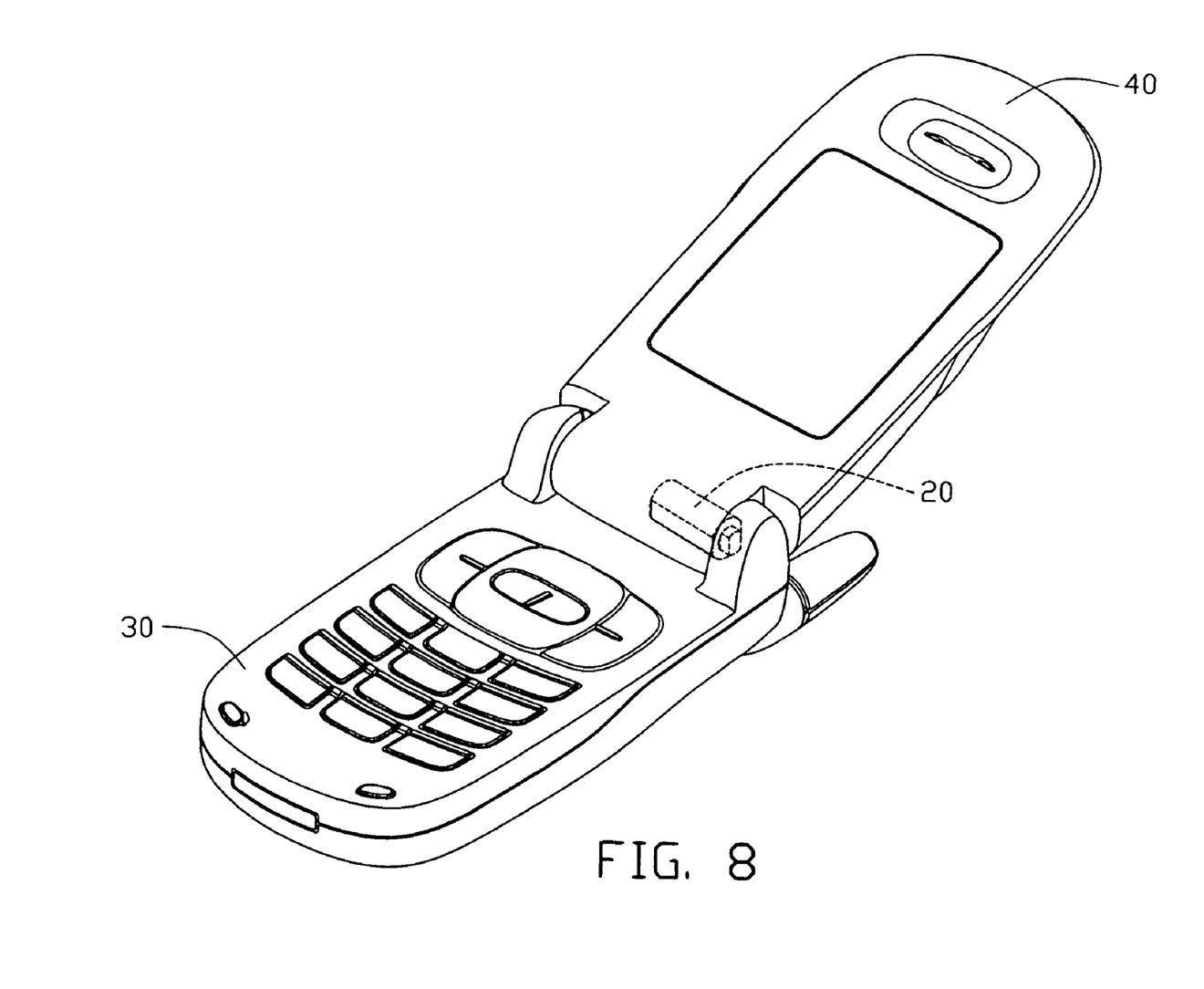
FIG. 8 is an isometric view of an electronic device, employing the hinge mechanism of FIGS. 1-7, with the hinge mechanism being shown in phantom.

Referring to FIG. 8, the hinge mechanism 20 is used in an exemplary portable electronic device having a main housing 30 and a cover 40. The rotating member 18 engages with the main housing 30 by the deformed shaft portion 183. The case 10 engages with the cover 40 by the non-round outside surface of the deformed wall, thereby the case 10 can rotate together with the cover 40 relative to the main housing 30. When the cover 40 is closed, the hinge mechanism 20 is in a steady state with the line L1 connecting centers of the first hollows 125 is vertical to the line L2 connecting centers of the second hollows 187 and the two combined shafts 14 are slantwise relative to an axis of the case 10 or an axis of the rotating member 18, and are skew to one another, shown in FIG. 5.

Figure 6:
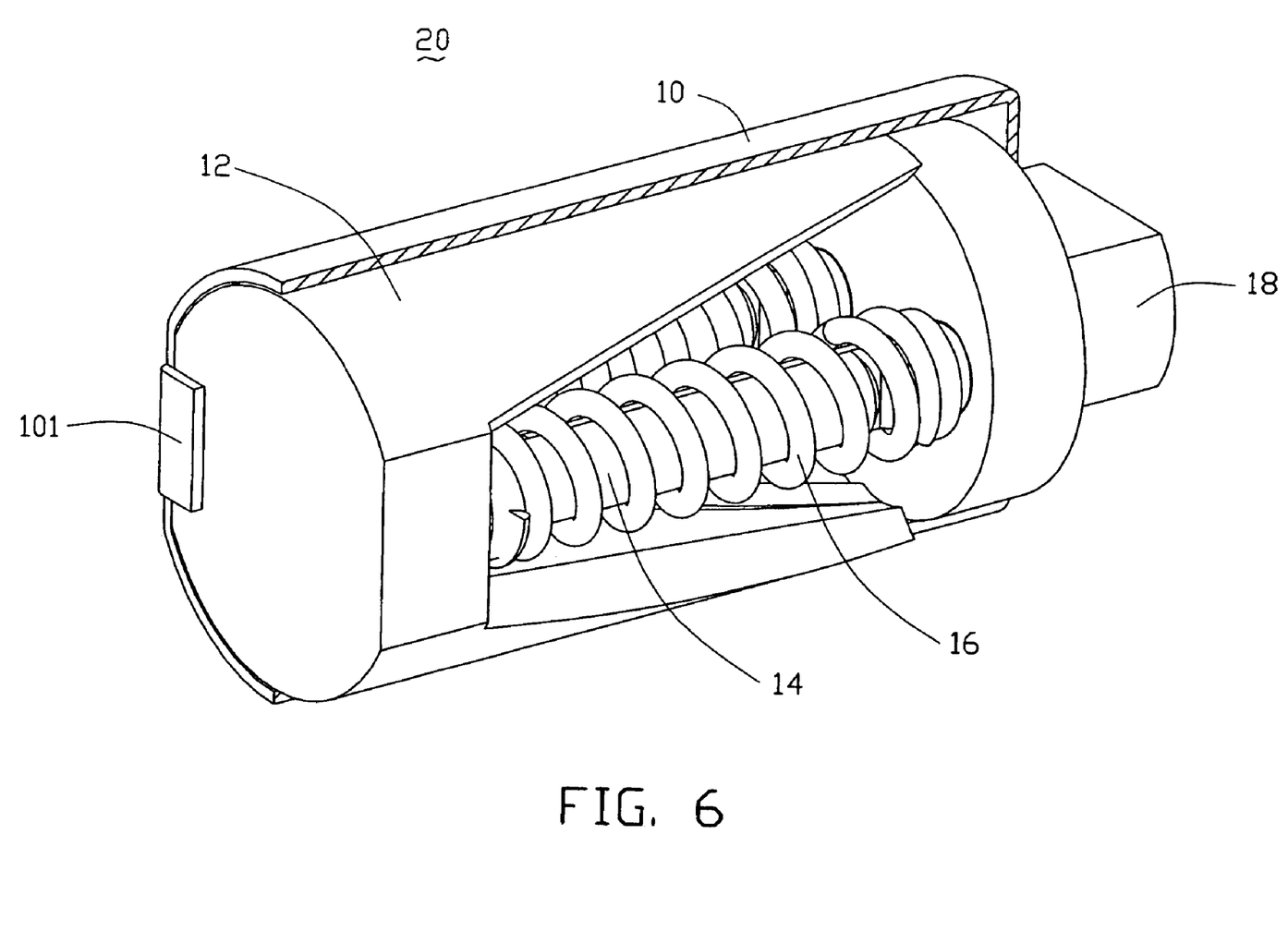
FIG. 6 is similar to FIG. 5, but showing an opening state.
Figure 7:
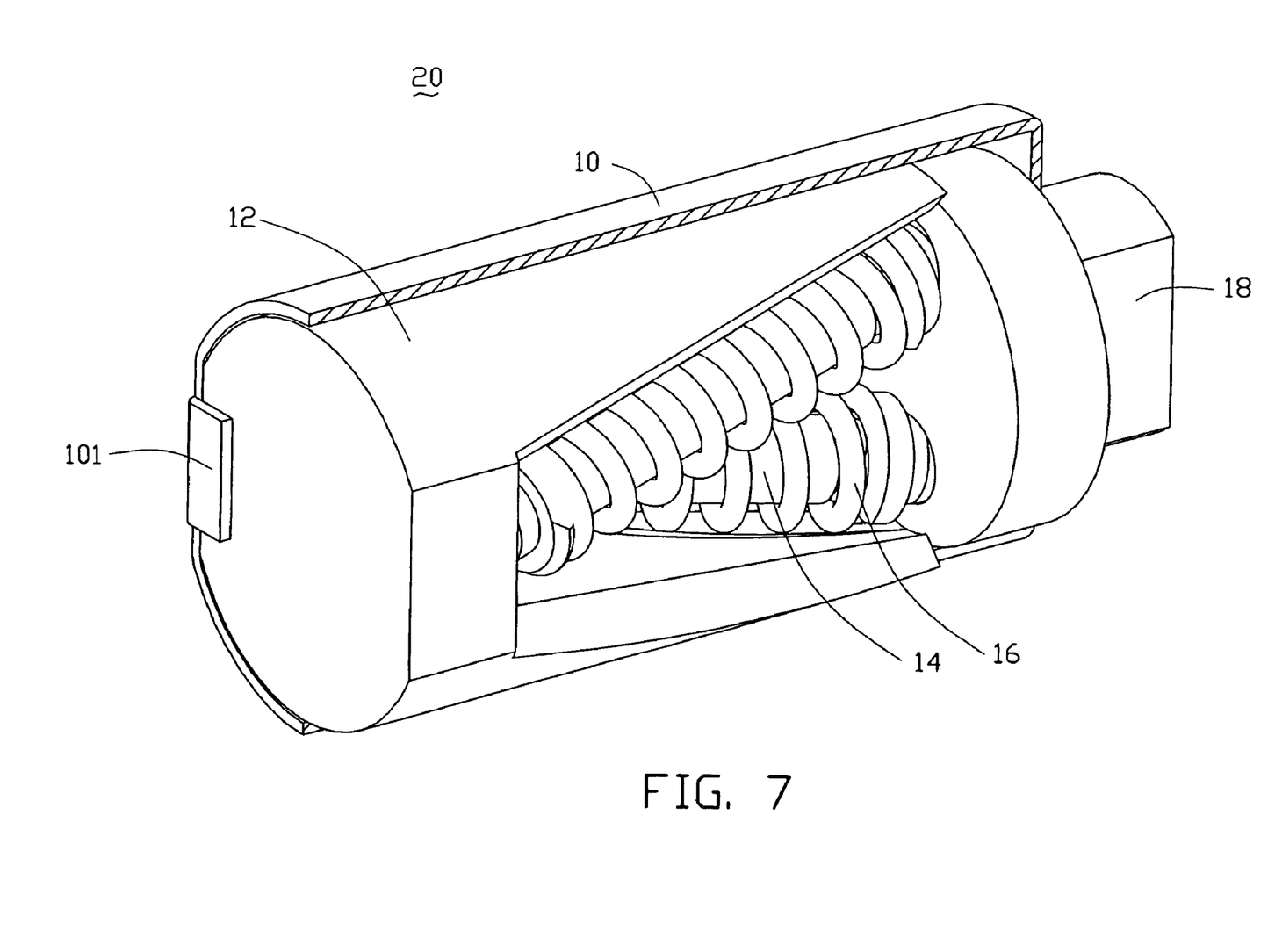
FIG. 7 is similar to FIG. 5 and FIG. 6, but showing an open state.

When the cover 40 is manually opened, the case 10 rotates together with the cover 40. The mounting member 12 rotates together with the case 10 and the springs 16 are compressed further. The head portions 143 of shaft members 141 rotate in the first and second hollows 125, 187. The two shaft members 141 of each combined shaft 14 are axially compelled close to each other, thereby the axial length of combined shafts 14 gradually decrease. When the cover 40 is rotated to 90°, as shown in FIG. 6, where the line L1 connecting centers of the first hollows 125 is parallel to the line L2 connecting centers of the second hollows 187, the two combined shafts 14 are parallel to each other. The springs 16 are compressed to shortest. In this position, the length of the combined shafts 14 decreases to a minimum. When the cover 40 is manually rotated to an angle slightly larger than 90°, the cover 40 continues to rotate to 180° automatically due to the restore force of the compressed springs 16. The two shaft members 141 of each combined shaft 14 are axially compelled away from each other by the elasticity of the springs 16, thereby the length of the combined shafts 14 increases gradually. When the cover rotates to 180°, shown in FIG. 7, the line L1 connecting centers of the first hollows 125 is perpendicular to the line L2 connecting centers of the second hollows 181, and the two combined shafts 14 are skew and abut against each other. The cover is thus stopped in this fully open position. The closing of the cover 40 is substantially the reverse of the above-described opening process in the same manner.

In the above embodiment, each combined shaft 14 and one corresponding spring 16 essentially form a retractable elastic shaft, i.e., a shaft having an adjustable axial length. In an alternative embodiment, the combined shaft 14 and the spring 16 can be replaced by other retractable elastic shaft such as a rubber shaft. If the open angle is required to be other than 180°, it can be carried out by changing the relatively positions of the first hollows 125 and the second hollows 187. The mounting member 12 can be other shaped with two first hollows 125. The combined shaft 14 can be one or more than two. The case 10 can be omitted by assembling the mounting member 12, the combined shafts 14, the springs 16 and the rotating member 18 in the portable electronic device directly. The deformed wall and deformed shaft mean non-round wall and shaft with non-round circumference and can be replaced by other structures such as a block. The case 10 can also engage with the main housing 30 of the portable electronic device and the rotating member 18 can engage with the cover 40 correspondingly. The first and second hollows 125, 187 and the outer end of head portion 143 of the combined shafts 14 are other shaped other than hemispherical-shaped.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A hinge mechanism comprising:
   at least one retractable elastic shaft with two opposite ends;
   a mounting member located at one end of the retractable elastic shaft, the mounting member defining at least one first hollow therein; and a rotating member located at the other end of the retractable elastic shaft, the rotating member defining at least one second hollow therein;

wherein the first and second hollows respectively receive the two ends of the retractable elastic shaft, the mounting member is rotatable relative to the rotating member to drive the retractable elastic shaft to move between a first position where the retractable elastic shaft is slantwise to an axis of the rotating member and a second position where the retractable elastic shaft is parallel to the axis of the rotating member.

2. The hinge mechanism as claimed in claim 1, wherein the hinge mechanism further comprises a case with an open end and an opposite end defined a hole, the mounting member, the retractable elastic shaft and the rotating member are set in the case in turn, and the rotating member partly protrudes out from the hole of the case.

3. The hinge mechanism as claimed in claim 2, wherein the mounting member comprises a base and two extensions, the first hollow is defined in the base at one side thereof facing the rotating member, the extensions extend from said one side.

4. The hinge mechanism as claimed in claim 3, wherein the inner and outside surface of the wall of the case are deformed cylinder-shaped, the base of the mounting member is deformed cylinder-shaped and unrotatably engaged with deformed an inner surface of the case.

5. The hinge mechanism as claimed in claim 4, wherein the retractable elastic shaft comprises a combined shaft and a spring surrounding the combined shaft, the combined shaft comprises two shaft members.

6. The hinge mechanism as claimed in claim 5, wherein each of the shaft members comprises a head portion, a flange, and a shank portion, the flange is arranged between the head portion and the shank portion, the head portion has a hemispherical outer end, the shank portion is half-cylinder-shaped, the head portions are respectively at two opposite ends of the combined shaft and respectively engage in the first and second hollows, and opposite ends of the spring resiliently abut against the flanges of the shaft members, the first and second hollows are hemispherical-shaped.

7. The hinge mechanism as claimed in claim 2, wherein the rotating member comprises a cylinder-shaped limiting portion and a deformed shaft portion extending from the limiting portion, the second hollow is defined in the limiting portion opposite to the deformed shaft portion.

8. The hinge mechanism as claimed in claim 2, wherein the number of the first hollow, the second hollow and the retractable elastic shaft is two, and the two retractable elastic shafts are skewed to each other in the first position.

9. An electronic device comprising:
a main housing;
a cover; and
a hinge mechanism for rotatably hinging the main housing and the cover, the hinge mechanism comprising:
a case fixedly engaged with one of the main housing and the cover;
at least one retractable elastic shaft with two opposite shaft ends;
a mounting member fixedly located in the case and engaged with one shaft end; and
a rotating member partly rotatably located in the case and engaged with the other shaft end, a part of the rotating member protruding out of the case and being fixedly engaged with the other of the main housing and the cover;
wherein the mounting member is rotatable relative to the rotating member to drive the retractable elastic shaft to move between a first position where the retractable elastic shaft is slantwise to an axis of the rotating member and a second position where the retractable elastic shaft is parallel to the axis of the rotating member.

10. The electronic device as claimed in claim 9, wherein the mounting member comprises a base having a first hollow defined in one side thereof facing the rotating member, the one shaft end engaged in the first hollow.

11. The electronic device as claimed in claim 10, wherein two extensions extend from the base toward the rotating member, outer surfaces of the extensions are commonly located on a hypothetical cylinder, and the extensions are engagingly received in the case.

12. The electronic device as claimed in claim 10, wherein the inner and outside surface of the wall of the case are deformed cylinder-shaped, the base of the mounting member is deformed cylinder-shaped and unrotatably engage with an deformed inner surface of the case.

13. The electronic device as claimed in claim 10, wherein the rotating member comprises a cylinder-shaped limiting portion rotatably received in the case, a second hollow is defined in the limiting portion, and the other shaft end engages in the second hollow.

14. The electronic device as claimed in claim 9, wherein the number of the retractable elastic shaft is two, and the two retractable elastic shafts are skewed to each other in the first postition.

15. The electronic device as claimed in claim 9, wherein the retractable elastic shaft comprises a combined shaft and a spring surrounding the combined shaft, the combined shaft comprises two shaft members, each of the shaft members comprises a head portion, a flange, and a shank portion, the flange is arranged between the head portion and the shank portion, the head portions each hemispherical outer end, the head portions are respectively located at two opposite ends of the combined shaft and respectively form the shaft ends of retractable elastic shaft, and opposite ends of the spring resiliently abut against the flanges of the shaft members.

16. A hinge mechanism for hinging a cover and a main house of an electronic device, the hinge mechanism comprising:
a rotating member configured for being fixed relative to one of the main housing and the cover;
a mounting member configured for being fixed relative to the other one of the main housing and the cover, the mounting member spaced from and rotatable with respect to the rotating member; and
two elastic shafts each with two opposite shaft ends engaged between the mounting member and the rotating member, one shaft end of the elastic shaft engaged with the mounting member, and the other shaft end engaged with the rotating member; the two elastic shafts circumferentially biasing the mounting member and the rotating member with respect to each other, and being skewedly abuttable against each other to stop further relative rotation therebetween, the mounting member being rotatable relative to the rotating member to drive the two elastic shafts to move between a first position where the elastic shafts are slantwise to an axis of the rotating member and a second position where the retractable elastic shafts are parallel to the axis of the rotating member.

17. The hinge mechanism of claim 16, further comprising a case configured to be fixed with the other one of the main housing and the cover, the mounting member is fixedly received in the case, and the rotating member is rotatably received in the case.

18. The hinge mechanism of claim 17, wherein the rotating member has a portion thereof protruding out the case, the protruding portion being configured for being fixed with the one of the main housing and the cover.

19. The hinge mechanism of claim 16, wherein each elastic shaft comprises a combined shaft and a spring attached around the combined shaft, the combined shaft comprises two discrete shaft members each having a shank portion, a head portion, and a flange arranged between the shank portion and the head portion, the flanges of the shaft members are respectively disposed at opposite ends of the combined shaft, the spring is compressed between the flanges.

* * * * *